Nov. 18, 1930.  R. STODDARD  1,781,825
MILK BOTTLE CRATE
Filed Aug. 17, 1927
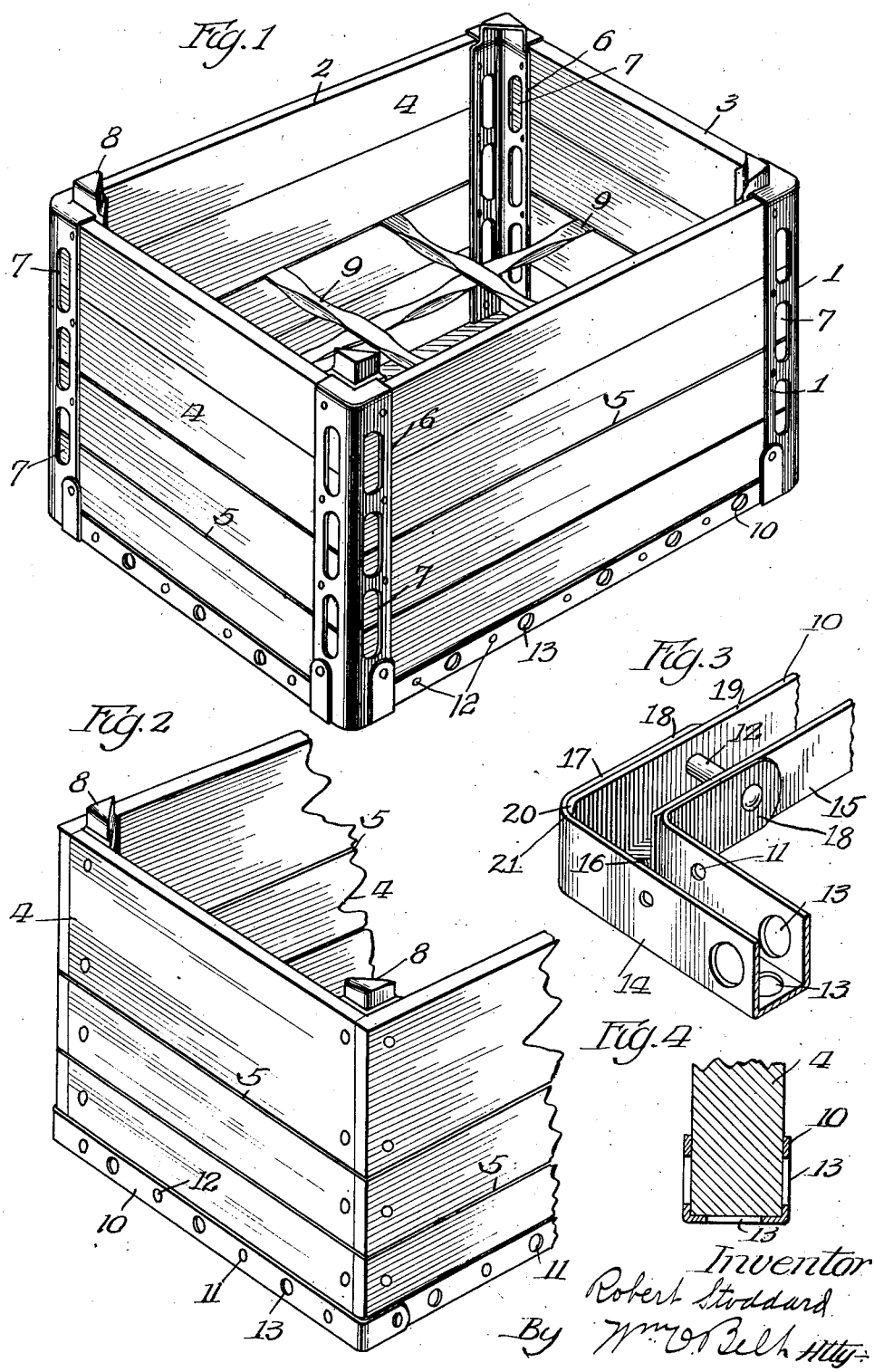
Inventor
Robert Stoddard
By Wm. O. Bell, Atty.

Patented Nov. 18, 1930

1,781,825

UNITED STATES PATENT OFFICE

ROBERT STODDARD, OF CHICAGO, ILLINOIS, ASSIGNOR TO MILK BOTTLE CRATE COMPANY, OF CHICAGO, ILLINOIS, A CORPORATION OF ILLINOIS

MILK-BOTTLE CRATE

Application filed August 17, 1927. Serial No. 213,507.

This invention relates to a novel and improved crate or box and it has for its object to provide sanitary reinforcing means particularly desirable for milk bottle crates.

More specifically the object is to provide perforated reinforcing members for crates or boxes which will allow for ventilation through the reinforcing members to maintain the crate or box in a sanitary condition.

And another object is to provide a perforated reinforcing frame which is adapted to fit the conventional milk bottle crate to reinforce the same and to provide for ventilation through the frame at the bottom of the crate.

In the accompanying drawings in which I have shown a preferred embodiment of the invention, Fig. 1 is a perspective view of my improved milk bottle crate.

Fig. 2 is a detail perspective view of the conventional crate which has my improved frame applied thereto.

Fig. 3 is a detail perspective view of my improved reinforcing frame.

Fig. 4 is a detail vertical elevation through a side of the crate having my invention applied thereto.

Referring now to the drawings 1 indicates a crate having sides 2 and ends 3 made up of boards 4 spaced apart to provide ventilating interstices 5. Secured to the inside and to the outside of each corner of the crate are vertical reinforcing angle members 6 provided with apertures 7. The tops of the inside members are provided with projections 8 preferably made integral therewith and adapted to be received in corresponding recesses in another bottom of the crate so that the crates may be stacked one upon the other and securely anchored in place. Suitable cross members 9 arranged inside of the crate may be fastened thereto in any suitable manner to divide the crate into separate compartments to receive individual bottles to prevent the bottles from striking each other during handling. Securely fastened to the bottom of the crate and extending around the entire periphery thereof is applied my improved channel frame 10 which is bent from sheet metal and is fastened together in any suitable manner, as shown in Fig. 3. The frame is provided with small apertures 11 which are adapted to receive rivets 12 or other fastening means for securing the frame to the crate.

When the milk bottles are being filled some of the milk may spill and enter the crevices between the frame and the crate and become sour and unsanitary. Even by washing the crates in the conventional manner, as by spraying with a hose, this old milk is not entirely washed away; the wood becomes wet and rots making a very unsanitary crate for storing milk. To overcome this condition I provide the frame with a series of apertures 13 in the sides and the bottom to provide ventilation at the bottom of the crate allowing the air to get at that part of the crate and also allowing the spilled milk or the washing water to drain off.

In Fig. 2 I have shown the conventional type of milk bottle crate without the outside reinforcing members and having my frame secured thereto. The frame will strengthen the bottom of the crate which usually becomes damaged and worn in handling and at the same time maintains sanitation of this type of crate and greatly prolongs its life by adding this additional reinforcing.

I preferably make the frame in four sections comprising two ends 14 and two sides 15, each of which are U or channel shaped and formed from sheet metal, Figs. 3 and 4. These ends and sides are mitred at the bottom as at 16 where they join each other. The ends have their sides 17 projecting beyond the mitre to provide straps or cleats 18 which are bent around to overlap the sides 15 and are fastened thereto by the rivets or bolts 12. The outer legs 19 of the sides are are slightly rounded as at 20 to conform with the corner 21 formed by bending the straps which overlap the sides 15. By making the frame in this manner I provide a frame which is very simple to make and which provides reinforcing at the corners where the wear and strain is the greatest. After the frame is assembled it may easily be applied to the crate and will fit easily thereon due to the lack of any sharp corners or edges. Also, by making the frame in sections as described any section which has become worn out can be replaced without the necessity of providing an entire new frame.

While my invention pertains primarily to milk bottle crates it is to be understood that it may be applied successfully to any other type of crate and to boxes in general, and is not restricted to the specific use set forth.

Changes may be made in the form, construction and arrangement of the parts without departing from the spirit of the invention or sacrificing any of the advantages thereof and I reserve the right to make all such changes as fairly fall within the scope of the following claim.

I claim:

A rectangular crate having sides and ends fastened together, a channel frame receiving the bottom edges of the sides and ends of the crate, said channel frame having the side members of one end fitting within the side members of the other end adjacent a corner of the crate, the outer side member of one end being bent around the corner of the crate, and extending beyond said corner and the outer side member of the other end lying flush against the inside of said bent portion, and outside angle members fastened at the corners of the crate with their lower ends overlapping and secured to said channel frame.

ROBERT STODDARD.